(12) United States Patent
Sun et al.

(10) Patent No.: US 8,378,616 B2
(45) Date of Patent: Feb. 19, 2013

(54) MOTOR CONTROLLER AND MOTOR ASSEMBLY

(75) Inventors: Chiping Sun, Hong Kong (CN); Yanhong Xue, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 566 days.

(21) Appl. No.: 12/360,888

(22) Filed: Jan. 28, 2009

(65) Prior Publication Data

US 2009/0189550 A1 Jul. 30, 2009

(30) Foreign Application Priority Data

Jan. 28, 2008 (GB) .................................. 0801450.8

(51) Int. Cl.
*H02P 8/00* (2006.01)

(52) U.S. Cl. ........ 318/696; 318/116; 318/560; 318/569; 318/575; 318/474; 702/79; 701/36; 358/474; 400/144.2

(58) Field of Classification Search .................. 318/116, 318/727, 569, 575; 700/245; 701/82; 709/212; 369/34; 400/114.2, 70, 320; 710/28
See application file for complete search history.

(56) References Cited

U.S. PATENT DOCUMENTS

| | | | | |
|---|---|---|---|---|
| 4,755,070 A * | 7/1988 | Cerutti | ................. | 400/144.2 |
| 5,638,522 A * | 6/1997 | Dunsmuir et al. | ............ | 715/763 |
| 5,670,855 A * | 9/1997 | Okunishi | ..................... | 318/696 |
| 5,877,443 A * | 3/1999 | Arends et al. | ................... | 84/454 |
| 6,188,190 B1 * | 2/2001 | Arakawa | ....................... | 318/560 |
| 6,297,610 B1 * | 10/2001 | Bauer et al. | ................... | 318/562 |
| 6,577,095 B1 * | 6/2003 | Firehammer | ................. | 318/727 |
| 6,583,591 B2 * | 6/2003 | Echols et al. | ................. | 318/112 |
| 6,903,848 B2 * | 6/2005 | Kirita | ............................ | 358/474 |
| 6,936,989 B2 * | 8/2005 | Hogan | .......................... | 318/569 |
| 7,183,736 B1 * | 2/2007 | Chou et al. | .................... | 318/575 |
| 7,536,533 B2 * | 5/2009 | Leung et al. | .................... | 712/36 |
| 7,668,674 B2 * | 2/2010 | McNutt | .......................... | 702/79 |
| 7,869,920 B2 * | 1/2011 | Mark | .............................. | 701/36 |
| 2002/0156556 A1 * | 10/2002 | Ruffner | .......................... | 701/23 |
| 2007/0032916 A1 | 2/2007 | Mark | | |

FOREIGN PATENT DOCUMENTS

| | | |
|---|---|---|
| DE | 44 17 602 A1 | 11/1994 |
| EP | 1 857 942 A1 | 11/2007 |
| JP | 1028167 A | 1/1989 |
| JP | 01028167 A * | 1/1989 |

\* cited by examiner

*Primary Examiner* — Walter Benson
*Assistant Examiner* — Jorge Carrasquillo
(74) *Attorney, Agent, or Firm* — Muncy, Geissler, Olds & Lowe, PLLC

(57) ABSTRACT

Apparatus, having multiple motor modules, has an MCU module. Each motor module has an electronically controlled motor. The MCU module has an MCU and an interface for connecting to a bus from a CPU. In use the MCU module receives control signals from the CPU and in turn instructs a selected one of the motors to operate.

12 Claims, 3 Drawing Sheets

MOTOR CONTROLLER AND MOTOR ASSEMBLY

CROSS REFERENCE TO RELATED APPLICATIONS

This non-provisional patent application claims priority under 35 U.S.C. §119(a) from Patent Application No. 0801450.8 filed in Great Britain on Jan. 28, 2008.

FIELD OF THE INVENTION

The present invention relates to a scheme for controlling a plurality of motors, particularly electronically controlled motors such as brushless DC motors and piezoelectric motors.

BACKGROUND OF THE INVENTION

Generally, a modern passenger vehicle has many electrically controlled actuators with electric motors. For example, actuators are used in safety mirrors, seats, and vehicle air conditioning systems where they control flaps or barriers used to control or redirect air flow within the vehicle for allowing more or less air to pass over a heat exchanger coil or directing air to certain parts of the vehicle such as windscreen vents or feet vents. The electric motors moving these flaps are generally controlled from a centralized control panel or, when fitted, from a remote control panel. Automate control of the air conditioning system based on sensor feedbacks, etc is also allowed.

Previously, these motors were generally PMDC (Permanent magnet direct current) brush motors. This type of motors is easy to control manually, has acceptable life and is relatively cheap. However, they are noisy either audibly, electrically or both. Noise is becoming a problem in the modern passenger vehicle. Audible noise generated by the motors has become very noticeable as passenger compartments are being effectively isolated from road and engine noise. Electrical noise is also undesirable as the modern vehicle has multiple computer systems and electronic devices susceptible to electrical noise. For automated systems controlled by a computer, such as mirror, seat, and temperature controls with memory, the motors are connected to the computer via a computer bus such as a LIN Bus or CAN Bus. Electronically controlled motors are more suited to this kind of system. One drawback to using electronically controlled motors is the cost of the electronics may be more than the cost of the motor being controlled. In an air conditioning system, the temperature changes occur slowly and thus most of the time the motors are idle. The seat and mirror memory systems may be operated only when there is a change of driver.

A typical computer controlled system is shown in FIG. 1. An on board computer system 10, which maybe a single computer or a number of computers linked together, is referred to as a CPU. A plurality of motors, M1, M2, ... Mn, are connected to the CPU 10 via a LIN bus system 12. This requires each motor 31 to be fully independent, having its own LIN bus driver 23, MCU 21, feedback sensor 33, power switch 24 and identifier 32. This is expensive in terms of electronic hardware which is used only occasionally.

SUMMARY OF THE INVENTION

The present invention aims to reduce the total cost of the electronics for a system having multiple electronically controlled motors by sharing some of the electronic components (circuits) between the motors. This has the added benefit of increasing the reliability of the overall system by reducing the number of possible faults.

Accordingly, in one aspect thereof, the present invention provides apparatus comprising: an MCU module having an MCU and an interface for connecting to a primary bus from a CPU; and a plurality of motor modules, each motor module having an electronically controlled motor and an Identifier; wherein the motor modules are electrically connected to the MCU module, and the MCU module receives control signals from the CPU and in turn instructs a selected one of the motor modules to operate.

Preferably, the MCU module is connected to the motor modules by a bus.

Preferably, the bus carries high voltage AC signals for driving the selected motor.

Preferably, the MCU module further comprises a power switch circuit which provides power signals for operating the motors.

Preferably, the MCU determines which motor to select in response to a command from the CPU based on information provided by the Identifier.

Preferably, the motor module further comprises a feedback sensor for giving information to the MCU about a condition of the motor.

Preferably, the electronically controlled motors are piezoelectric motors.

Alternatively, the MCU module is connected to the motor modules by low voltage signal wires.

Accordingly, in a second aspect thereof, the present invention provides a method of controlling multiple electronically controlled motors, the method comprising the steps of: connecting a MCU to a bus from a CPU; connecting the MCU to the plurality of motors; using the MCU to select which motor to operate and in which direction based on the signals received by the MCU from the CPU.

Preferably, the method includes the steps of providing each of the motors as part of a motor module and connecting each motor to the MCU via an Identifier located in the motor module.

Preferably, the method includes the steps of providing a power switch circuit in each motor module to drive the respective motor.

Preferably, the method includes the steps of providing a power switch circuit in the MCU module and sharing the output from the power switch circuit with the motor modules.

According to a third aspect thereof, the present invention provides a method of controlling multiple electronically controlled motors, the method comprising the steps of using a single MCU to interface between the multiple motors and a CPU.

Preferably, the method includes the step of providing a single power switch circuit to selectively operate each of the motors and using the MCU to select which motor is to be operated based on instructions from the CPU.

Preferably, the method includes the steps of providing feedback sensors associated with each motor and passing signals from the feedback sensor to the MCU to determine when to deselect the selected motor.

BRIEF DESCRIPTION OF THE DRAWINGS

A preferred embodiment of the invention will now be described, by way of example only, with reference to the accompanying drawings, in which.

DETAILED DESCRIPTION OF THE PREFERRED EMBODIMENT

Figure 1:
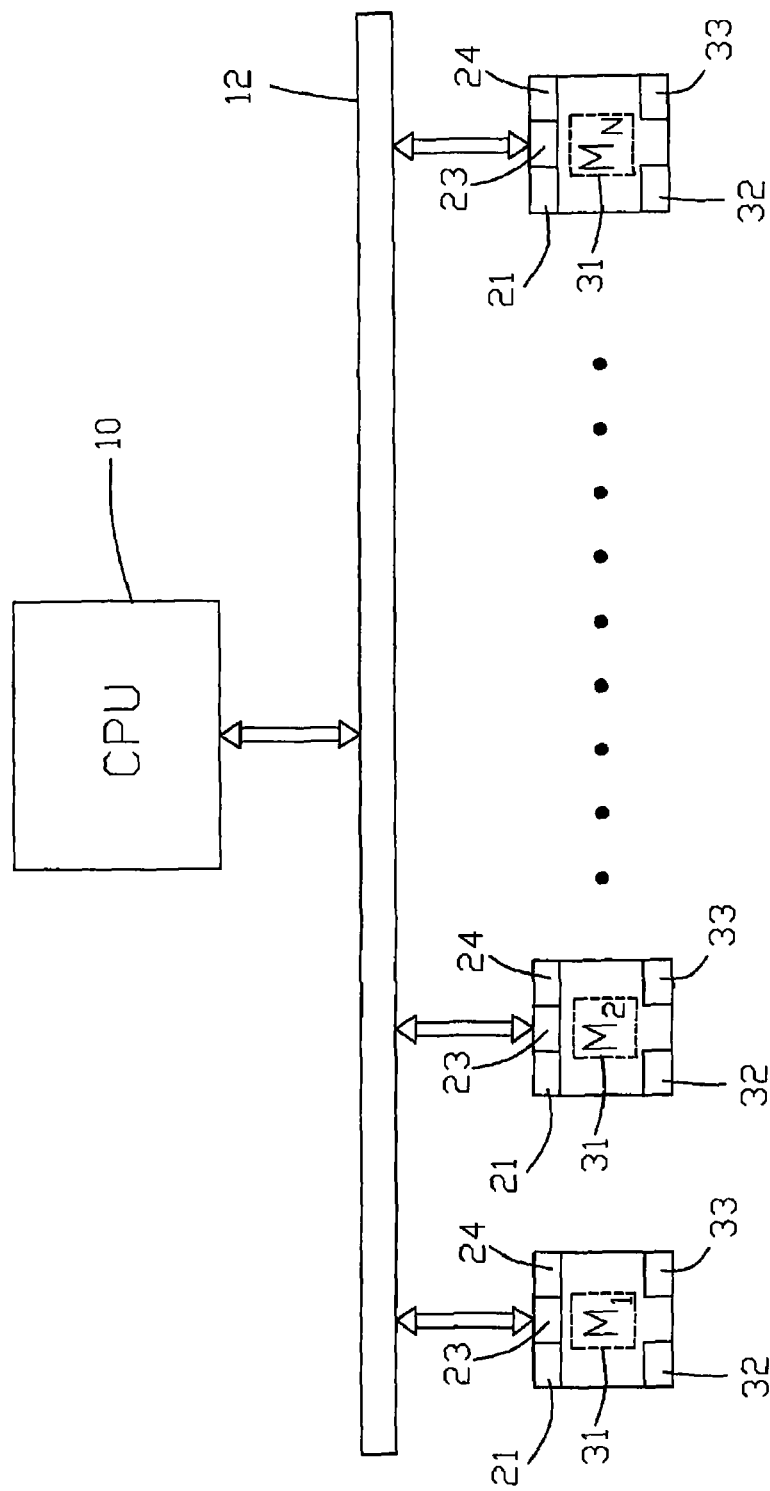
FIG. 1 is a block diagram of a motor control scheme according to a conventional method.
Figure 2:
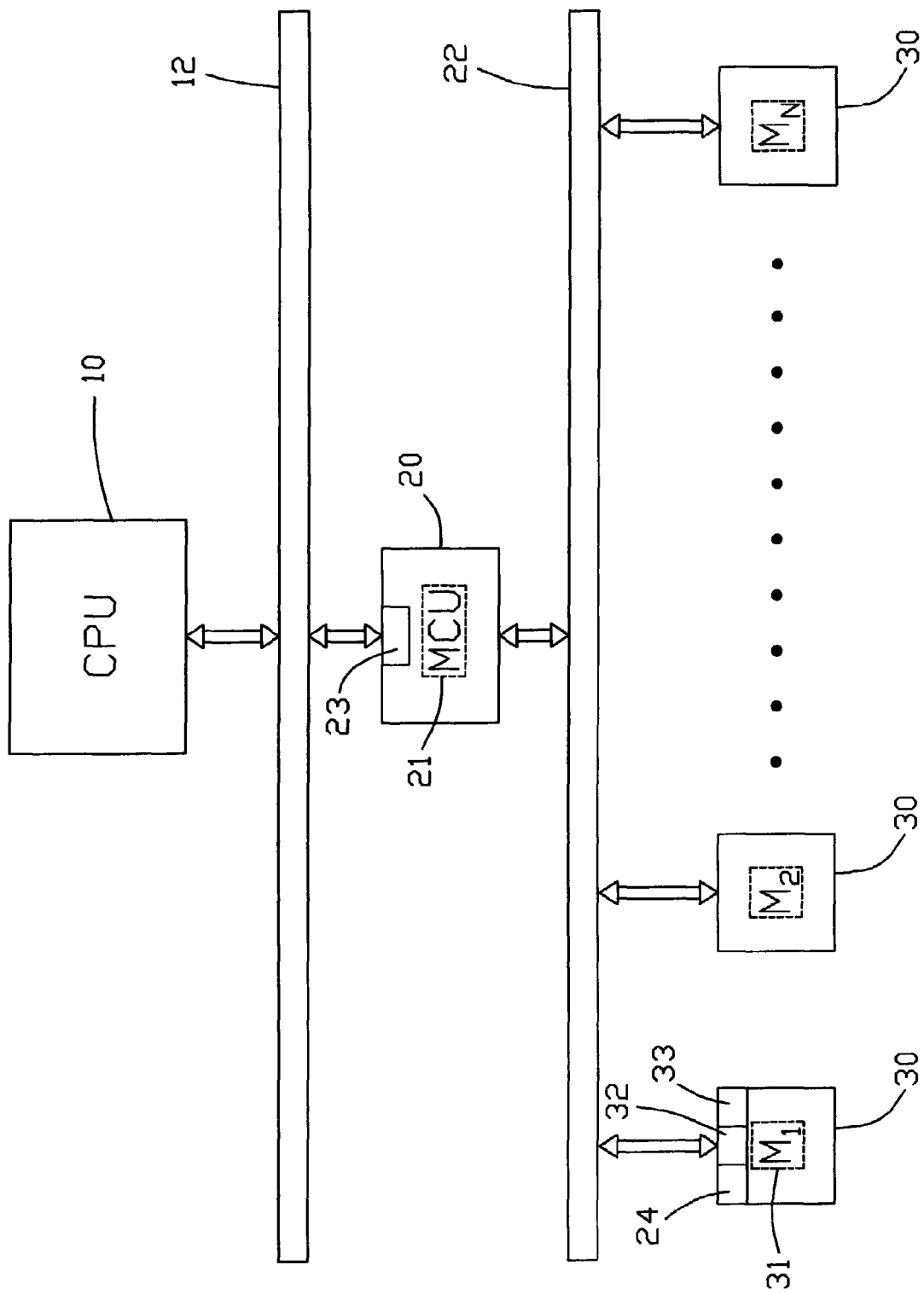
FIG. 2 is a block diagram of a multiple motor system according to first embodiment of the present invention.

FIG. 2 shows a block diagram of a multiple motor system or assembly in accordance with a first preferred embodiment of the present invention. A bus which we call primary bus 12 is connected to a CPU 10. The primary bus 12 may be a LIN bus (Local Interconnection Network bus), a CAN bus (Controller Area Network bus) or a bus of another protocol. The primary bus 12 connects the CPU 10 to a MCU module 20 and some other components (not shown in the figure) which are generally known to those skilled in the relevant arts. The MCU module 20 is connected to a plurality of motor modules 30, designated as M1, M2, . . . Mn, via another bus 22. The bus 22 is a low voltage signal bus carrying only low voltage signals for controlling the motor modules 30.

The MCU module 20 has an MCU 21 and a primary bus driver 23. The primary bus driver 23 enables the MCU 21 to send and receive signals over the primary bus 12. Each motor modules 30 comprises an electronically controlled motor 31, a power switch 24, an Identifier 32 for communication with the MCU 21, and optionally, a feedback sensor or circuit 33, such as a position sensor. The bus 22 could be a hard wired bus if the number of motor modules 30 is small, otherwise a dedicated computer bus is preferred.

Thus, in this simple embodiment, a single MCU 21 is shared by all of the motor modules 30 of the system or motor assembly, thereby greatly reducing the total cost of the system. Also, only one primary bus driver 23 is required.

Figure 3:
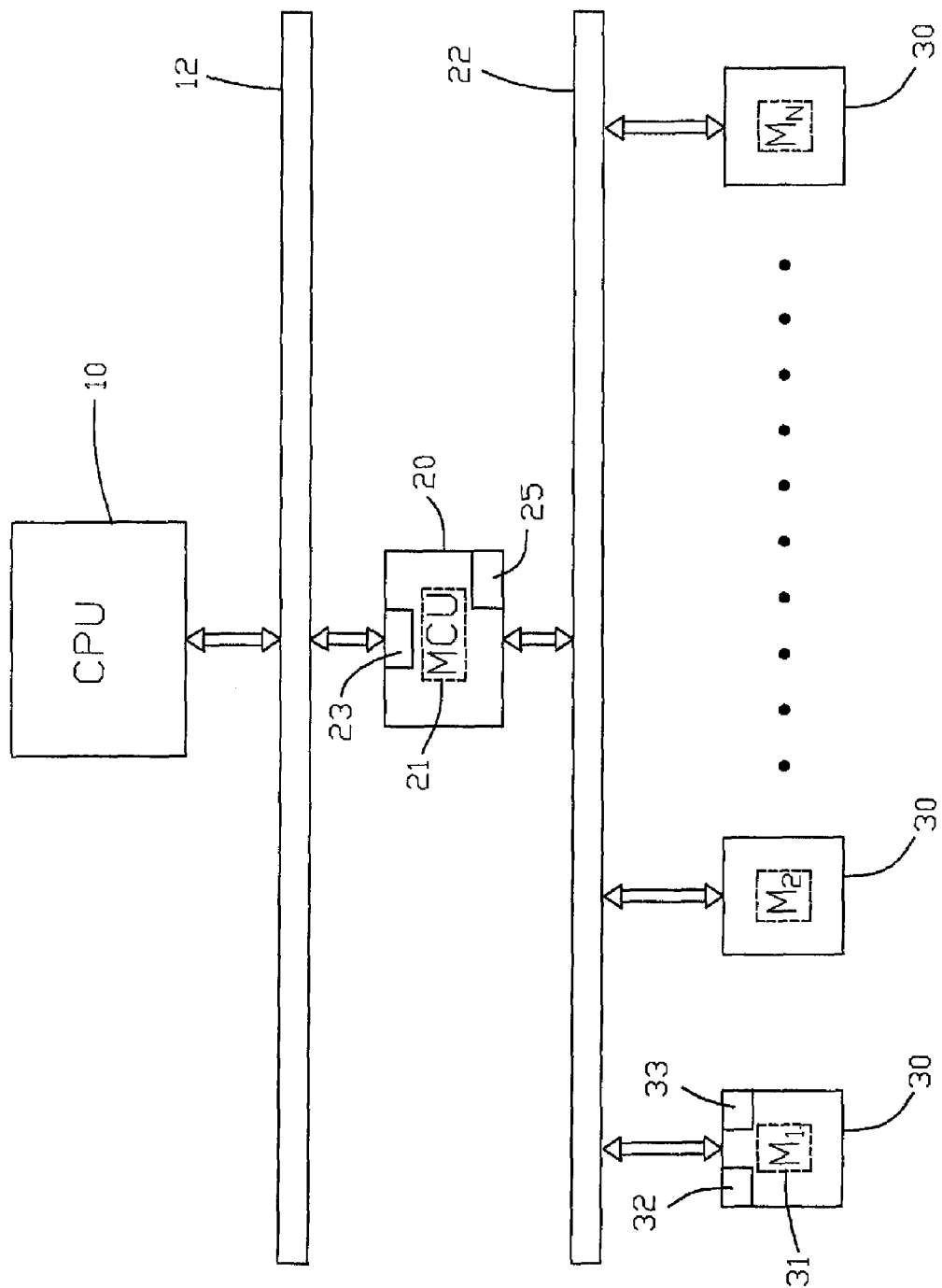
FIG. 3 is a block diagram of a multiple motor system according to a second embodiment of the present invention.

FIG. 3 illustrates a multiple motor system in accordance with a second embodiment of the present invention. In the embodiment, the MCU module 20 also has a power switch circuit 25. Thus each motor modules 30 includes only the motor 31, the Identifier 32 and the optional feedback sensor 33. In this embodiment, the local bus 22 carries both low voltage control signals as well as power signal. For a stepper motor, a brushless DC motor or a piezoelectric motor, etc., these power lines would carry high voltage pulses to operate the motors.

In this second embodiment, the motor modules 30 share a common MCU 21, the power driver circuit 25 and the primary bus driver 23, thus further reducing the complexity and total cost of the system or apparatus.

In accordance with a preferred embodiment of the present invention, the electronically controlled motors in above embodiments are piezoelectric motors. In this scenario, the MCU module has a piezoelectric driver circuit and each motor module simply connects the motor to the driver signals sent out by the MCU module when that motor is selected to be activated. Selection is achieved by way of the Identifier. The driver signals are high voltage AC signals but the current level is relatively low compared to other types of DC motors. However, the arrangement can be used for other types of electronically controlled motors especially if the motors are physically located close by so that the bus 22 is short.

Thus it can be seen that the preferred embodiments of this invention reduce the complexity and cost of the multiple motor system by sharing a number of electronic components between motors.

In the description and claims of the present application, each of the verbs "comprise", "include" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the invention has been described with reference to an air conditioning system for a passenger vehicle, it could be applied to other multiple motor systems found within a vehicle, such as the seat and mirror control and memory systems. Indeed, the invention could be applied to multi-motor systems of non-automotive applications.

Definitions of some of the abbreviations used in this description are:
CPU—Central Processing Unit
MCU—Micro Controller Unit
LIN bus—Local Interconnection Network
CAN bus—Controller Area Network The term CPU or Central Processing Unit, can be used to refer to the processing chip within a computer or it may refer to the unit doing the data or signal processing and includes a computer, a series of computers and a central data processing processor. The computer system of the modern vehicle may have a number of computers working together in a distributed computer network and any of these computers, or all of the computers collectively may be referred to as the CPU.

LIN bus and CAN bus are two well known examples of primary bus protocols used in vehicle computer systems.

The invention claimed is:

1. A motor controller for controlling a plurality of motor modules in response to signals from a CPU, each motor module having an electronically controlled motor and an Identifier, the motor controller comprising:
   a first bus coupled to the CPU;
   a MCU module having a MCU and a bus driver enabling the MCU to receive signals via the first bus; and
   a second bus coupled between the MCU module and the plurality of motor modules;
   wherein the MCU module is coupled to the Identifiers of the plurality of motor modules via the second bus and is configured to receive control signals from the CPU and in turn selectively instruct at least one electrically controlled motor to operate via the Identifiers of corresponding motor modules.

2. The motor controller of claim 1, wherein:
   each motor module further includes a power switch; and
   the second bus carries only control signals for controlling the plurality of motor modules.

3. The motor controller of claim 1, wherein:
   the MCU module further includes a power switch circuit; and
   the second bus carries control signals for controlling the plurality of motor modules as well as power signals to selectively operate the at least one selected motor.

4. The motor controller of claim 1, wherein the electrically controlled motors include piezoelectric motors.

5. The motor controller of claim 4, wherein the second bus carries high voltage AC signals for driving the at least one selected piezoelectric motor.

6. The motor controller of claim 1, wherein each of the plurality of motor modules further comprises a feedback sensor for providing information to the MCU about a condition of the motor.

7. A motor assembly operated in response to signals from a CPU, comprising:
- a first bus coupled to the CPU;
- a MCU module having a MCU and a bus driver enabling the MCU to receive signals via the first bus;
- a second bus coupled to the MCU module; and
- a plurality of motor modules, each having an Identifier coupled to the second bus and a motor couple to the Identifier;
- wherein the MCU is configured to receive control signals from the CPU via the first bus and information from the Identifiers via the second bus and in turn selectively instructs at least one electrically controlled motor to operate based on the information.

8. The motor assembly of claim 7, wherein each motor module further includes a power switch and the second bus carries only control signals for controlling the plurality of motor modules.

9. The motor assembly of claim 7, wherein the MCU module further includes a power switch circuit and the second bus carries control signals for controlling the plurality of motor modules as well as power signals to selectively operate the at least one selected motor.

10. The motor assembly of claim 7, wherein the electrically controlled motors includes piezoelectric motors.

11. The motor assembly of claim 10, wherein the second bus carries high voltage AC signals for driving the at least one selected piezoelectric motor.

12. The motor assembly of claim 7, wherein each of the plurality of motor modules further comprises a feedback sensor for providing information to the MCU about a condition of the motor.

* * * * *